United States Patent
Britt et al.

(10) Patent No.: US 9,894,473 B2
(45) Date of Patent: Feb. 13, 2018

(54) SYSTEM AND METHOD FOR SECURELY CONNECTING NETWORK DEVICES USING OPTICAL LABELS

(71) Applicant: AFERO, INC., Los Altos, CA (US)

(72) Inventors: Joe Britt, Los Altos, CA (US); Shin Matsumura, Los Altos, CA (US); Houman Forood, San Francisco, CA (US); Scott Zimmerman, Mountain View, CA (US); Phillip Myles, Los Gatos, CA (US); Sean Zawicki, Mountain View, CA (US); Daisuke Kutami, San Francisco, CA (US); Shannon Holland, Los Gatos, CA (US); Justin Lee, Berkeley, CA (US)

(73) Assignee: AFERO, INC., Los Altos, CA (US)

(*) Notice: Subject to any disclaimer, the term of this patent is extended or adjusted under 35 U.S.C. 154(b) by 0 days.

(21) Appl. No.: 15/473,423

(22) Filed: Mar. 29, 2017

(65) Prior Publication Data
US 2017/0208432 A1 Jul. 20, 2017

Related U.S. Application Data

(62) Division of application No. 14/575,535, filed on Dec. 18, 2014, now abandoned.

(51) Int. Cl.
*H04W 4/00* (2009.01)
*H04L 29/08* (2006.01)
(Continued)

(52) U.S. Cl.
CPC ............ *H04W 4/008* (2013.01); *H04L 63/06* (2013.01); *H04L 63/061* (2013.01);
(Continued)

(58) Field of Classification Search
None
See application file for complete search history.

(56) References Cited

U.S. PATENT DOCUMENTS

| 4,654,793 A | 3/1987 | Elrod |
| 5,574,750 A | 11/1996 | Peponides et al. |

(Continued)

FOREIGN PATENT DOCUMENTS

| CN | 1054693 A | 9/1991 |
| EP | 2806356 A1 | 11/2014 |

(Continued)

OTHER PUBLICATIONS

Blackstock et al., "IoT Interoperability: A Hub-based Approach," International Conference on the Internet of Things, 2014, pp. 79-84.
(Continued)

*Primary Examiner* — Peter Poltorak
(74) *Attorney, Agent, or Firm* — Nicholson De Vos Webster & Elliott LLP

(57) ABSTRACT

A platform, apparatus and method are described for pairing devices. For example, one embodiment of a system for pairing devices comprises: a first data processing device having a machine-readable optical label associated therewith and including a first wireless communication interface; a second data processing device having a second wireless communication interface and an optical reader for reading identification data from the optical label associated with the first data processing device, the second wireless communication interface including pairing logic to use the identification data to pair with the first data processing device by establishing a secure communication channel between the first and second wireless communication interfaces.

21 Claims, 11 Drawing Sheets

(51) Int. Cl.
  *H04L 29/06* (2006.01)
  *H04W 84/12* (2009.01)
  *H04B 1/3816* (2015.01)

(52) U.S. Cl.
  CPC .......... *H04L 63/0853* (2013.01); *H04L 67/10* (2013.01); *H04L 67/306* (2013.01); *H04B 1/3816* (2013.01); *H04W 84/12* (2013.01)

(56) References Cited

U.S. PATENT DOCUMENTS

| | | | |
|---|---|---|---|
| 6,199,161 B1 | 3/2001 | Ahvenainen | |
| 7,142,674 B2 | 11/2006 | Brickell | |
| 7,146,613 B2 | 12/2006 | Chauvel et al. | |
| 7,165,180 B1 | 1/2007 | Ducharme | |
| 7,234,062 B2 | 6/2007 | Daum et al. | |
| 7,493,661 B2 | 2/2009 | Liu et al. | |
| 7,548,623 B2 | 6/2009 | Manabe | |
| 7,779,136 B2 | 8/2010 | Krishnan | |
| 7,903,822 B1 | 3/2011 | Hair et al. | |
| 8,396,449 B2 | 3/2013 | Hatton | |
| 8,477,948 B2 | 7/2013 | Shon et al. | |
| 8,570,168 B2 | 10/2013 | Logan et al. | |
| 8,761,821 B2 | 6/2014 | Tibbitts et al. | |
| 8,903,351 B2 | 12/2014 | Berry et al. | |
| 9,319,223 B2 | 4/2016 | Nix | |
| 9,338,638 B1 | 5/2016 | Palin et al. | |
| 9,378,634 B1 | 6/2016 | Kashyap et al. | |
| 2002/0013784 A1 | 1/2002 | Swanson | |
| 2002/0142746 A1 | 10/2002 | Li et al. | |
| 2003/0120555 A1* | 6/2003 | Kitagawa | G01C 21/3623 705/26.1 |
| 2004/0047324 A1 | 3/2004 | Diener | |
| 2004/0203826 A1 | 10/2004 | Sugar et al. | |
| 2004/0253923 A1* | 12/2004 | Braley | H04L 29/12009 455/41.2 |
| 2006/0018485 A1 | 1/2006 | Diefenderfer et al. | |
| 2006/0135064 A1* | 6/2006 | Cho | H04M 1/7253 455/41.1 |
| 2006/0195883 A1 | 8/2006 | Proctor et al. | |
| 2007/0126560 A1 | 6/2007 | Seymour et al. | |
| 2007/0150740 A1 | 6/2007 | Davis et al. | |
| 2007/0205876 A1 | 9/2007 | Nguyen | |
| 2008/0039203 A1* | 2/2008 | Ackley | A63F 13/216 463/40 |
| 2008/0120701 A1 | 5/2008 | Schiller et al. | |
| 2008/0129545 A1 | 6/2008 | Johnson et al. | |
| 2008/0180222 A1 | 7/2008 | Hollister et al. | |
| 2008/0200195 A1 | 8/2008 | Abe et al. | |
| 2008/0204555 A1 | 8/2008 | Hughes et al. | |
| 2008/0312946 A1 | 12/2008 | Valentine et al. | |
| 2009/0011739 A1 | 1/2009 | Cofta | |
| 2009/0019423 A1 | 1/2009 | Halter et al. | |
| 2009/0061806 A1 | 3/2009 | Saito et al. | |
| 2009/0082017 A1 | 3/2009 | Chang et al. | |
| 2009/0327996 A1 | 12/2009 | Siegemund et al. | |
| 2010/0075655 A1 | 3/2010 | Howarter et al. | |
| 2010/0115291 A1 | 5/2010 | Buer | |
| 2010/0122083 A1* | 5/2010 | Gim | G06F 21/6245 713/162 |
| 2010/0135494 A1 | 6/2010 | Armknecht et al. | |
| 2010/0201482 A1 | 8/2010 | Robertson et al. | |
| 2011/0081860 A1* | 4/2011 | Brown | H04N 1/00347 455/41.3 |
| 2011/0151768 A1 | 6/2011 | Snider et al. | |
| 2011/0191787 A1 | 8/2011 | Poleg et al. | |
| 2011/0200188 A1 | 8/2011 | Ghouti et al. | |
| 2011/0252235 A1 | 10/2011 | Dolan et al. | |
| 2011/0302078 A1 | 12/2011 | Failing | |
| 2011/0319088 A1 | 12/2011 | Zhou et al. | |
| 2012/0011360 A1* | 1/2012 | Engels | H04L 9/006 713/166 |
| 2012/0036552 A1 | 2/2012 | Dare et al. | |
| 2012/0079045 A1 | 3/2012 | Plotkin | |
| 2012/0108230 A1* | 5/2012 | Stepanian | G06F 21/10 455/422.1 |
| 2012/0122461 A1 | 5/2012 | Hossain et al. | |
| 2012/0142271 A1 | 6/2012 | Zhodzishsky et al. | |
| 2012/0187187 A1* | 7/2012 | Duff | G06Q 10/00 235/382 |
| 2012/0225640 A1 | 9/2012 | Bosch et al. | |
| 2012/0322384 A1* | 12/2012 | Zerr | H04L 67/303 455/41.3 |
| 2012/0331287 A1 | 12/2012 | Bowman et al. | |
| 2013/0012123 A1 | 1/2013 | Deluca | |
| 2013/0012134 A1 | 1/2013 | Jin et al. | |
| 2013/0042244 A1 | 2/2013 | Li et al. | |
| 2013/0085614 A1 | 4/2013 | Wenzel et al. | |
| 2013/0154819 A1 | 6/2013 | Stefanovski et al. | |
| 2013/0173484 A1* | 7/2013 | Wesby | G06Q 30/06 705/318 |
| 2013/0190010 A1 | 7/2013 | Chiou et al. | |
| 2013/0246996 A1 | 9/2013 | Duggal et al. | |
| 2013/0257604 A1 | 10/2013 | Mirle et al. | |
| 2013/0307702 A1 | 11/2013 | Pal et al. | |
| 2013/0342314 A1 | 12/2013 | Chen et al. | |
| 2014/0020073 A1* | 1/2014 | Ronda | G06F 21/31 726/7 |
| 2014/0038526 A1 | 2/2014 | Ennis et al. | |
| 2014/0047322 A1 | 2/2014 | Kim et al. | |
| 2014/0075198 A1 | 3/2014 | Peirce et al. | |
| 2014/0098957 A1 | 4/2014 | Larsson | |
| 2014/0148196 A1 | 5/2014 | Bassan-Eskenazi et al. | |
| 2014/0155031 A1 | 6/2014 | Lee et al. | |
| 2014/0179338 A1* | 6/2014 | Shang | H04W 4/023 455/456.1 |
| 2014/0244825 A1 | 8/2014 | Cao et al. | |
| 2014/0270166 A1 | 9/2014 | Avanzi et al. | |
| 2014/0279546 A1 | 9/2014 | Poole et al. | |
| 2014/0281547 A1 | 9/2014 | Modzelewski et al. | |
| 2014/0282357 A1 | 9/2014 | Padaliak et al. | |
| 2014/0289366 A1 | 9/2014 | Choi et al. | |
| 2014/0304381 A1 | 10/2014 | Savolainen et al. | |
| 2014/0310515 A1 | 10/2014 | Kim et al. | |
| 2014/0317293 A1 | 10/2014 | Shatzkamer | |
| 2014/0329467 A1* | 11/2014 | Ewing | H04B 1/3827 455/41.2 |
| 2014/0351312 A1 | 11/2014 | Lu et al. | |
| 2014/0351790 A1 | 11/2014 | Ghose et al. | |
| 2015/0006696 A1* | 1/2015 | Hershberg | H04L 67/12 709/223 |
| 2015/0019553 A1 | 1/2015 | Shaashua et al. | |
| 2015/0019714 A1 | 1/2015 | Shaashua et al. | |
| 2015/0029880 A1 | 1/2015 | Burns et al. | |
| 2015/0058802 A1 | 2/2015 | Turaj et al. | |
| 2015/0067329 A1 | 3/2015 | Ben et al. | |
| 2015/0067580 A1 | 3/2015 | Um et al. | |
| 2015/0071139 A1 | 3/2015 | Nix | |
| 2015/0089568 A1* | 3/2015 | Sprague | H04L 63/0876 726/1 |
| 2015/0106616 A1 | 4/2015 | Nix | |
| 2015/0113275 A1 | 4/2015 | Kim et al. | |
| 2015/0113592 A1 | 4/2015 | Curtis et al. | |
| 2015/0121470 A1 | 4/2015 | Rongo et al. | |
| 2015/0134761 A1 | 5/2015 | Sharma et al. | |
| 2015/0148989 A1 | 5/2015 | Cooper et al. | |
| 2015/0149042 A1 | 5/2015 | Cooper et al. | |
| 2015/0201022 A1 | 7/2015 | Kim et al. | |
| 2015/0207796 A1* | 7/2015 | Love | H04L 63/10 600/345 |
| 2015/0222517 A1 | 8/2015 | McLaughlin et al. | |
| 2015/0288667 A1* | 10/2015 | Alder | H04L 63/061 713/171 |
| 2015/0295713 A1 | 10/2015 | Oxford | |
| 2015/0296325 A1 | 10/2015 | Lee et al. | |
| 2015/0312041 A1* | 10/2015 | Choi | H04L 9/3231 713/175 |
| 2015/0319046 A1* | 11/2015 | Plummer | H04L 12/2807 715/736 |
| 2015/0324181 A1 | 11/2015 | Segal | |
| 2015/0326398 A1 | 11/2015 | Modarresi et al. | |
| 2015/0358157 A1 | 12/2015 | Zhang et al. | |

(56) References Cited

U.S. PATENT DOCUMENTS

| | | |
|---|---|---|
| 2015/0365787 A1 | 12/2015 | Farrell |
| 2016/0006729 A1 | 1/2016 | Yang et al. |
| 2016/0063767 A1 | 3/2016 | Lee et al. |
| 2016/0085960 A1 | 3/2016 | Priev et al. |
| 2016/0112870 A1 | 4/2016 | Pathuri |
| 2016/0127874 A1 | 5/2016 | Kingsmill et al. |
| 2016/0149696 A1 | 5/2016 | Winslow et al. |
| 2016/0150357 A1 | 5/2016 | Jung et al. |
| 2016/0182228 A1 | 6/2016 | Smith et al. |
| 2016/0182459 A1 | 6/2016 | Britt et al. |
| 2016/0182549 A1 | 6/2016 | Bachar et al. |
| 2016/0292938 A1 | 10/2016 | Zakaria |
| 2016/0295364 A1 | 10/2016 | Zakaria |

FOREIGN PATENT DOCUMENTS

| | | |
|---|---|---|
| WO | 2013179634 A1 | 12/2013 |
| WO | 2014131021 A2 | 8/2014 |

OTHER PUBLICATIONS

Final Office Action from U.S. Appl. No. 14/550,775, dated Apr. 6, 2017, 39 pages.
Final Office Action from U.S. Appl. No. 14/575,463, dated Aug. 30, 2016, 25 pages.
Final Office Action from U.S. Appl. No. 14/673,551, dated Feb. 23, 2017, 36 pages.
Galeev, "Bluetooth 4.0: An introduction to Bluetooth Low Energy" (Part I and II), EETimes, accessed on eetimes.com, Jul. 2011, 14 pages.
IBM, "The IBM vision of a smarter home enabled by cloud technology", Global Electronics Industry, white paper Sep. 2010, 16 pages.
International Search Report and Written Opinion for Application No. PCT/US16/25069, dated Jul. 1, 2016, 11 pages.
International Search Report and Written Opinion for Application No. PCT/US2015/061308, dated Mar. 16, 2016, 16 pages.
International Search Report and Written Opinion for Application No. PCT/US2015/065539, dated Feb. 12, 2016, 19 pages.
International Search Report and Written Opinion for Application No. PCT/US2016/035161, dated Aug. 31, 2016, 9 pages.
International Search Report and Written opinion for Application No. PCT/US2016/040819, dated Oct. 31, 2016, 12 pages.
Kainda et al., Usability and Security of Out-Of-Band Channels in Secure Device Pairing Protocols, Symposium on Usable Privacy and Security (SOUPS) Jul. 2009, 12 pages.
Non-Final Office Action from U.S. Appl. No. 14/550,667, dated Dec. 17, 2015, 10 pages.
Non-Final Office Action from U.S. Appl. No. 14/550,775, dated Sep. 21, 2016, 19 pages.
Non-Final Office Action from U.S. Appl. No. 14/575,463, dated Mar. 11, 2016, 23 pages.
Non-Final Office Action from U.S. Appl. No. 14/575,535, dated Aug. 12, 2016, 11 pages.
Non-Final Office Action from U.S. Appl. No. 14/673,551, dated Oct. 21, 2016, 27 pages.
Non-Final Office Action from U.S. Appl. No. 14/673,582, dated Nov. 3, 2016, 6 pages.
Non-Final Office Action from U.S. Appl. No. 14/727,811, dated Sep. 23, 2016, 17 pages.
Non-Final Office Action from U.S. Appl. No. 14/791,371, dated Nov. 4, 2016, 16 pages.
Non-Final Office Action from U.S. Appl. No. 14/791,373, dated Dec. 30, 2016, 18 pages.
Non-Final Office Action from U.S. Appl. No. 14/799,436, dated Mar. 24, 2017, 32 pages.
Non-Final Office Action from U.S. Appl. No. 14/927,732, dated Aug. 15, 2016, 14 pages.
Non-Final Office Action from U.S. Appl. No. 14/927,732, dated Dec. 5, 2016, 16 pages.
Notice of Allowance from U.S. Appl. No. 14/550,667, dated Jul. 11, 2016, 9 pages.
Notice of Allowance from U.S. Appl. No. 14/550,667, dated Oct. 7, 2016, 3 pages.
Notice of Allowance from U.S. Appl. No. 14/550,735, dated Dec. 22, 2016, 11 pages.
Notice of Allowance from U.S. Appl. No. 14/550,735, dated Mar. 22, 2017, 32 pages.
Notice of Allowance from U.S. Appl. No. 14/575,463, dated Apr. 5, 2017, 35 pages.
Notice of Allowance from U.S. Appl. No. 14/673,582, dated Mar. 1, 2017, 28 pages.
Notice of Allowance from U.S. Appl. No. 14/727,811, dated Apr. 12, 2017, 38 pages.
Perera et al, Dynamic Configuration of Sensors Using Mobile Sensor Hub in Internet o Things Paradigm, Research School of Computer Science, The Australian National University, arXiv:1302.1131 v1, Feb. 2013, 6 pages.
Qiao Q.,"The Design of Electronic Thermometer Based on Bluetooth Low Energy," IEEE, 2013, pp. 1-5.
Restriction Requirement for U.S. Appl. No. 14/575,535, dated Apr. 11, 2016, 5 pages.
Saxena et al., "Secure Device Pairing based on a Visual Channel", Proceedings of the 2006 IEEE Symposium on Security and Privacy, ISBN: 0769525741, 2006, 7 pages.
Sye Loong Keoh, Security the Internet of Things: A Standardization Perspective, IEEE Internet of Things Journal, vol. 1, No. 3, Jun. 2014; p. 265-275.
Wikipedia, "Bluetooth low energy" found at en.wikipedia.org/wiki/Bluetooth_low_energy, May 2010, 10 pages.
Hasbro Playskool Alphie Toy; 2009, downloaded from http://www.hasbro.com/common/documents/dad2af771c4311ddbd0b0800200c9a66/6135ABCA1989F3691034808DE78694FF.pdf, 5 pages.

* cited by examiner

SYSTEM AND METHOD FOR SECURELY CONNECTING NETWORK DEVICES USING OPTICAL LABELS

CROSS REFERENCE TO RELATED APPLICATIONS

This application is a divisional of co-pending U.S. patent application Ser. No. 14/575,535, filed Dec. 18, 2014.

BACKGROUND

Field of the Invention

This invention relates generally to the field of computer systems. More particularly, the invention relates to a system and method for securely connecting network devices using optical labels.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

IoT development and adoption has been slow due to issues related to connectivity, power, and a lack of standardization. For example, one obstacle to IoT development and adoption is that no standard platform exists to allow developers to design and offer new IoT devices and services. In order enter into the IoT market, a developer must design the entire IoT platform from the ground up, including the network protocols and infrastructure, hardware, software and services required to support the desired IoT implementation. As a result, each provider of IoT devices uses proprietary techniques for designing and connecting the IoT devices, making the adoption of multiple types of IoT devices burdensome for end users. Another obstacle to IoT adoption is the difficulty associated with connecting and powering IoT devices. Connecting appliances such as refrigerators, garage door openers, environmental sensors, home security sensors/controllers, etc, for example, requires an electrical source to power each connected IoT device, and such an electrical source is often not conveniently located.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
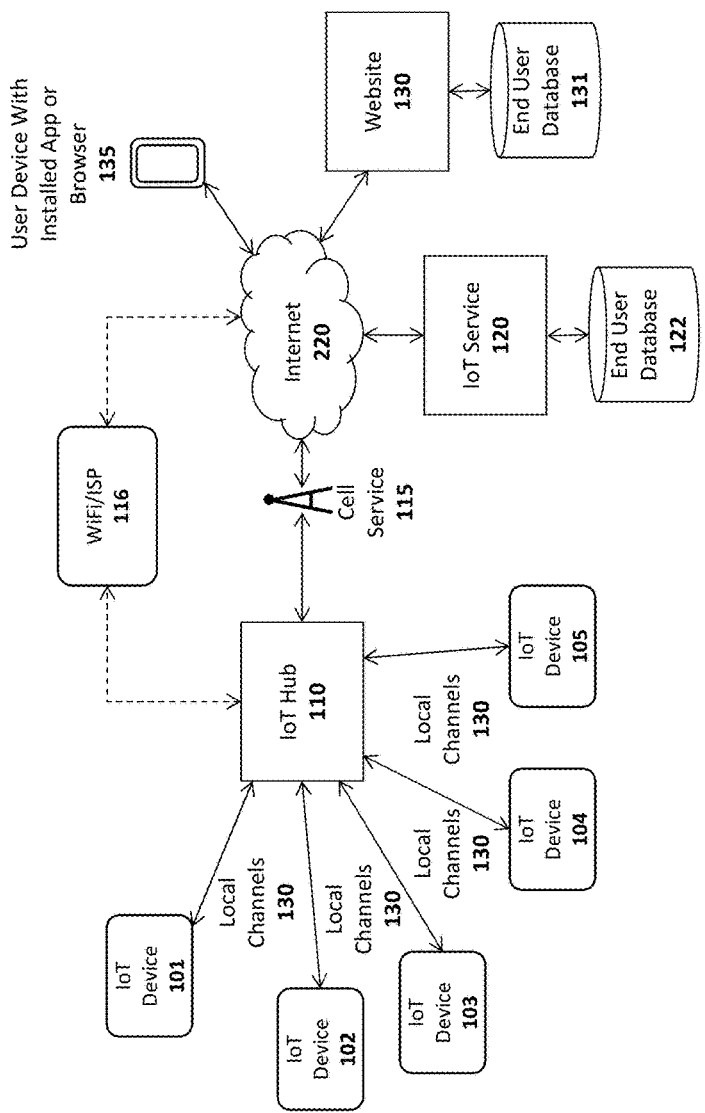
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectore, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
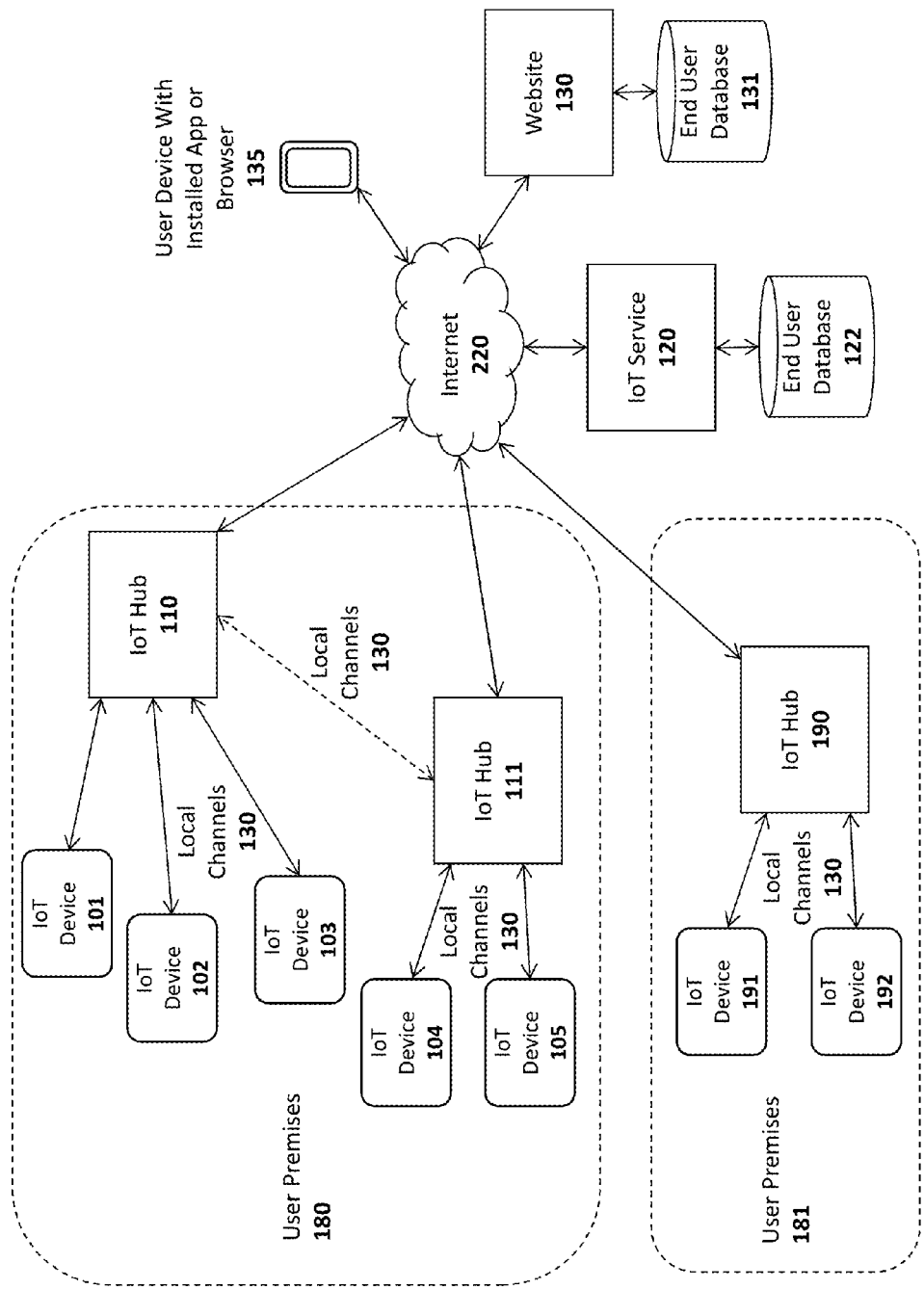

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
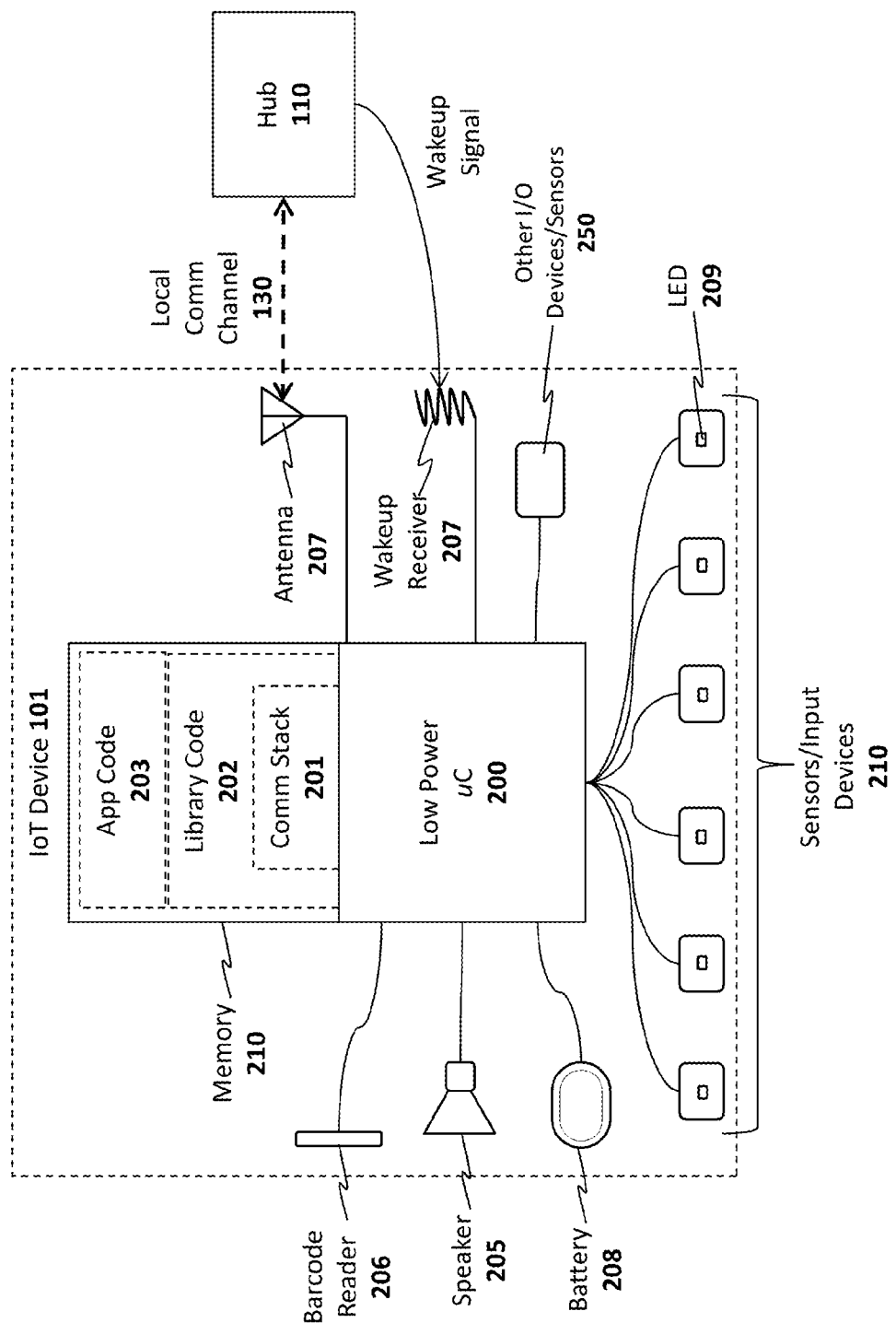
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys used by the embodiments described below (see, e.g., FIGS. 4-6 and associated text). Alternatively, the keys may be secured in a subscriber identify module (SIM) as discussed below.

Figure 3:
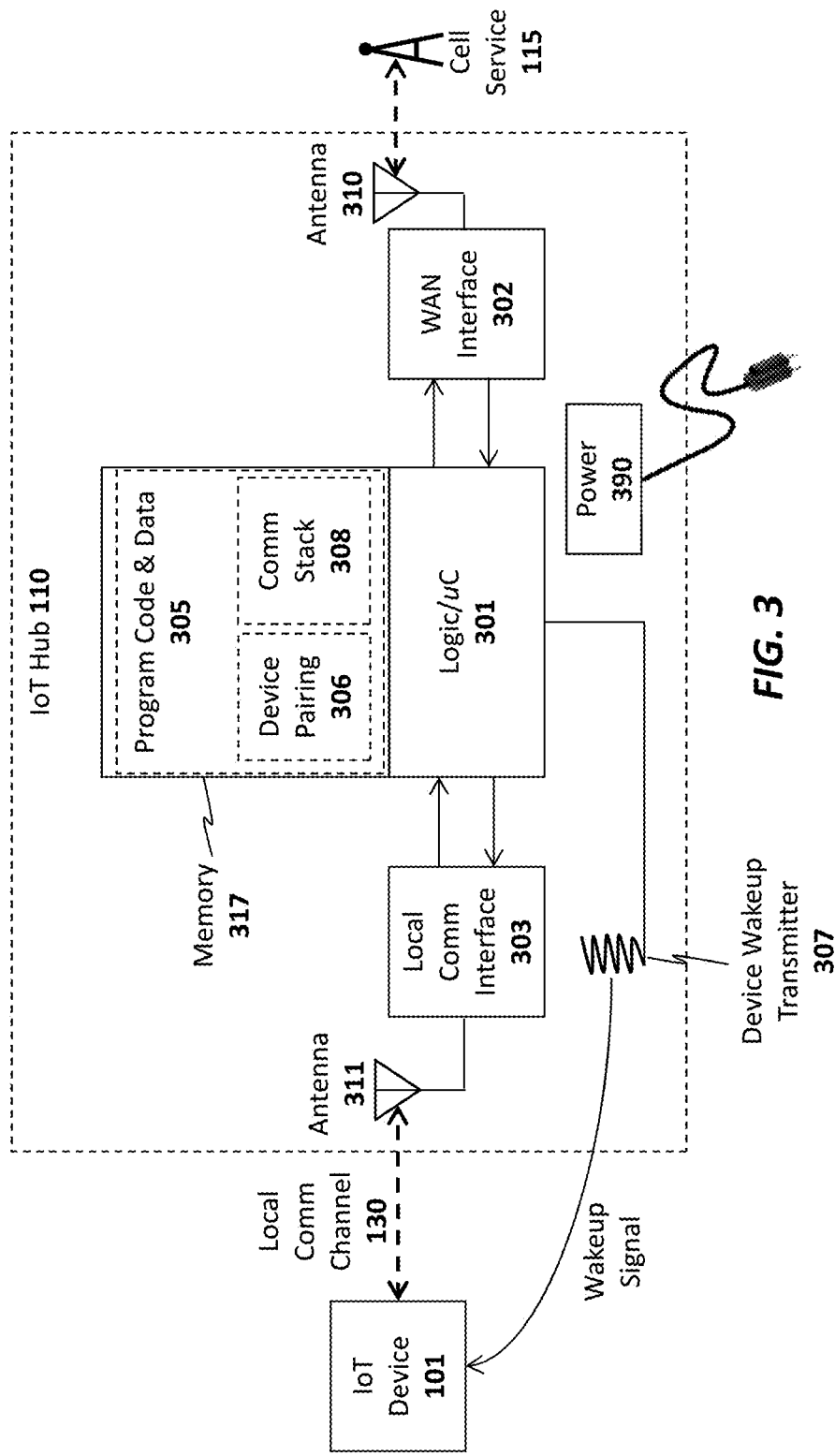
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys used by the embodiments described below (see, e.g., FIGS. 4-6 and associated text). Alternatively, the keys may be secured in a subscriber identify module (SIM) as discussed below.

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4:
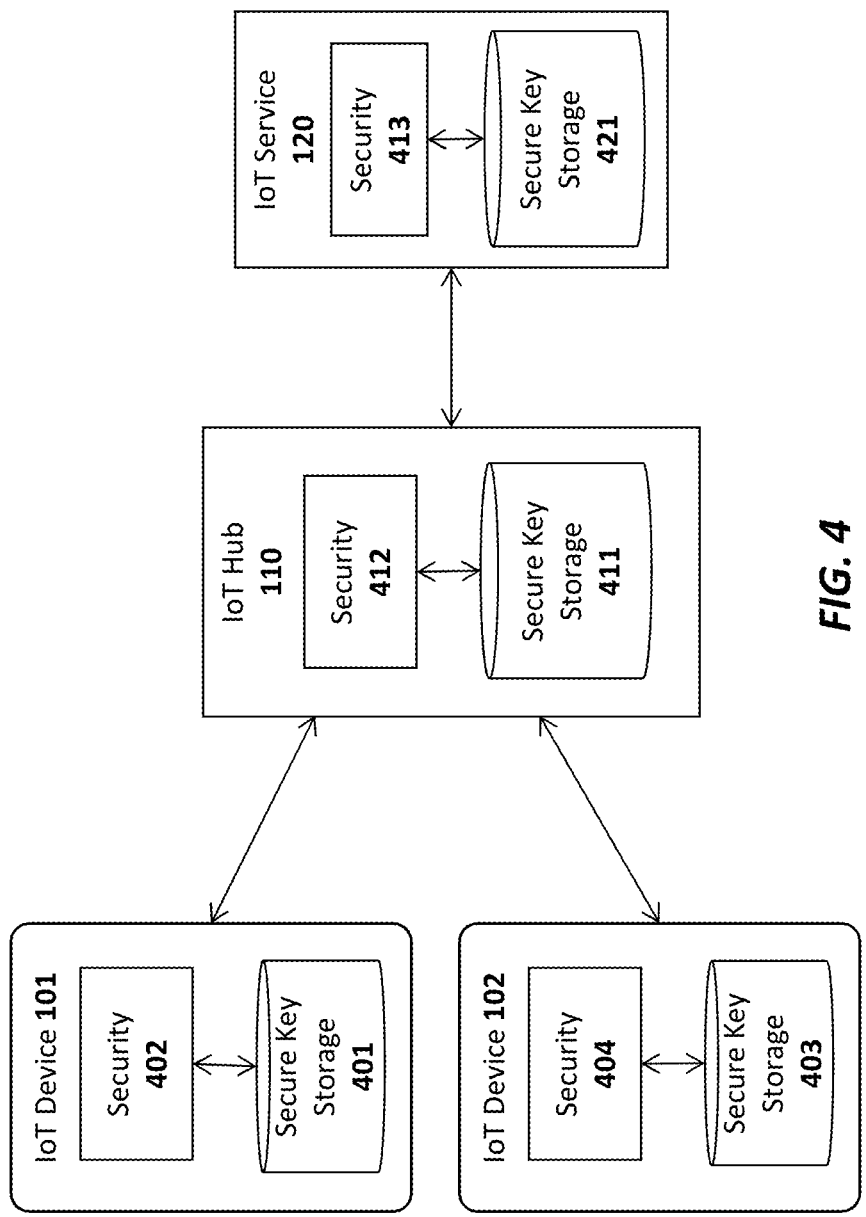
FIG. 4 illustrates a high level view of one embodiment of a security architecture.

FIG. 4 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 401, 403, respectively, for security storing each device's private key. Security logic 402, 404 then utilizes the securely stored private keys to perform the encryption/decryption operations described herein. Similarly, the IoT hub 110 includes a secure storage 411 for storing the IoT hub private key and the public keys of the IoT devices 101-102 and the IoT service 120; as well as security logic 412 for using the keys to perform encryption/decryption operations. Finally, the IoT service 120 may include a secure storage 421 for security storing its own private key, the public keys of various IoT devices and IoT hubs, and a security logic 413 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 411.

By way of example, in one embodiment, when the IoT service 120 needs to transmit a command or data to an IoT device 101 (e.g., a command to unlock a door, a request to read a sensor, data to be processed/displayed by the IoT device, etc) the security logic 413 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned anove so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 412 in the IoT hub is trusted, the service 120 could negotiate a session key with the hub security module 412 and then the security module 412 would negotiate a session key with each device 120. Messages from the service 120 would then be decrypted and verified in the hub security module 412 before being re-encrypted for transmission to the device 101.

In one embodiment, to prevent a compromise on the hub security module 412 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 402 on the IoT device 101 uses the public key of the IoT hub 110 to encrypt data packets sent to the IoT hub 110. The security logic 412 on the IoT hub 110 may then decrypt the data packets using the IoT hub's private key. Similarly, the security logic 402 on the IoT device 101 and/or the security logic 412 on the IoT hub 110 may encrypt data packets sent to the IoT service 120 using the public key of the IoT service 120 (which may then be decrypted by the security logic 413 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 5:
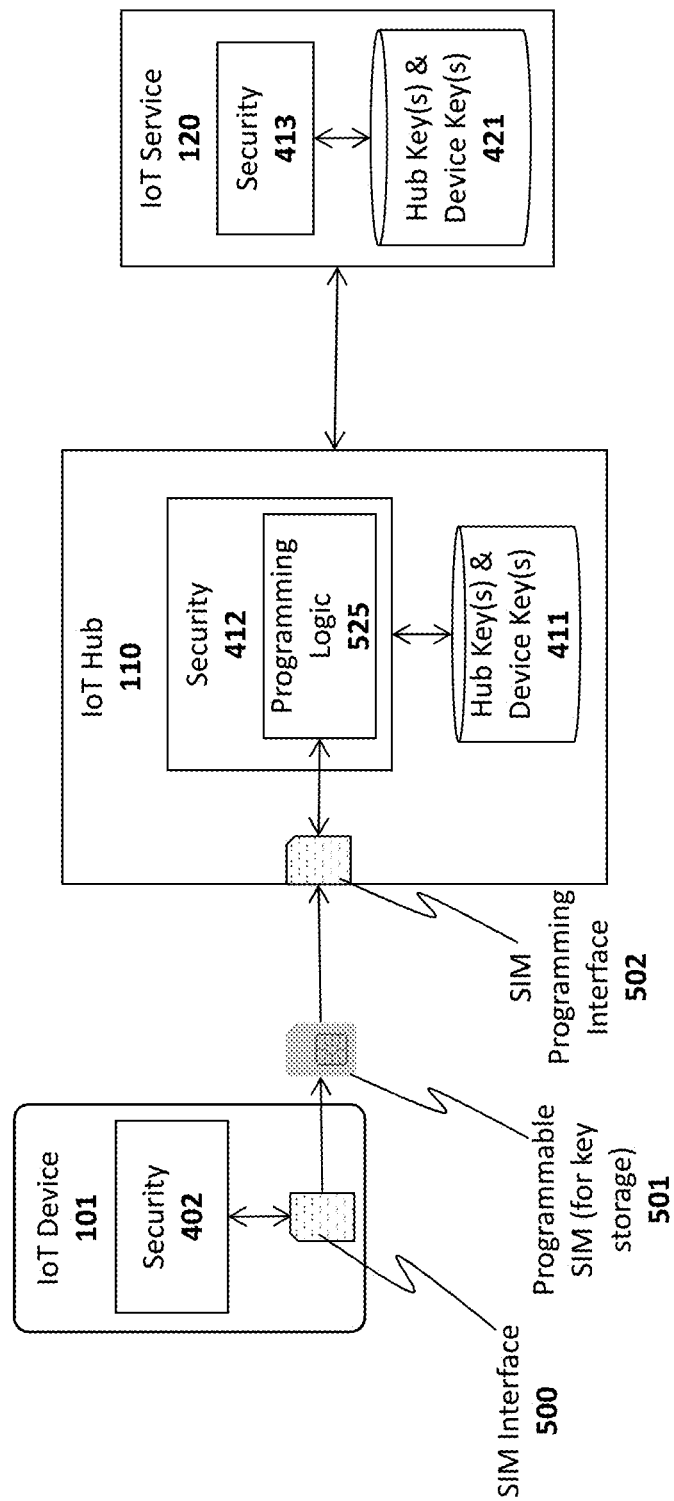
FIG. 5 illustrates one embodiment of an architecture in which a subscriber identity module (SIM) is used to store keys on IoT devices.

As illustrated in FIG. 5, in one embodiment, the secure key storage on each IoT device 101 is implemented using a programmable subscriber identity module (SIM) 501. In this embodiment, the IoT device 101 may initially be provided to the end user with an un-programmed SIM card 501 seated within a SIM interface 500 on the IoT device 101. In order to program the SIM with a set of one or more encryption keys, the user takes the programmable SIM card 501 out of the SIM interface 500 and inserts it into a SIM programming interface 502 on the IoT hub 110. Programming logic 525 on the IoT hub then securely programs the SIM card 501 to register/pair the IoT device 101 with the IoT hub 110 and IoT service 120. In one embodiment, a public/private key pair may be randomly generated by the programming logic 525 and the public key of the pair may then be stored in the IoT hub's secure storage device 411 while the private key may be stored within the programmable SIM 501. In addition, the programming logic 525 may store the public keys of the IoT hub 110, the IoT service 120, and/or any other IoT devices 101 on the SIM card 501 (to be used by the security logic 402 on the IoT device 101 to encrypt outgoing data). Once the SIM 501 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 5 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 502 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 6A:
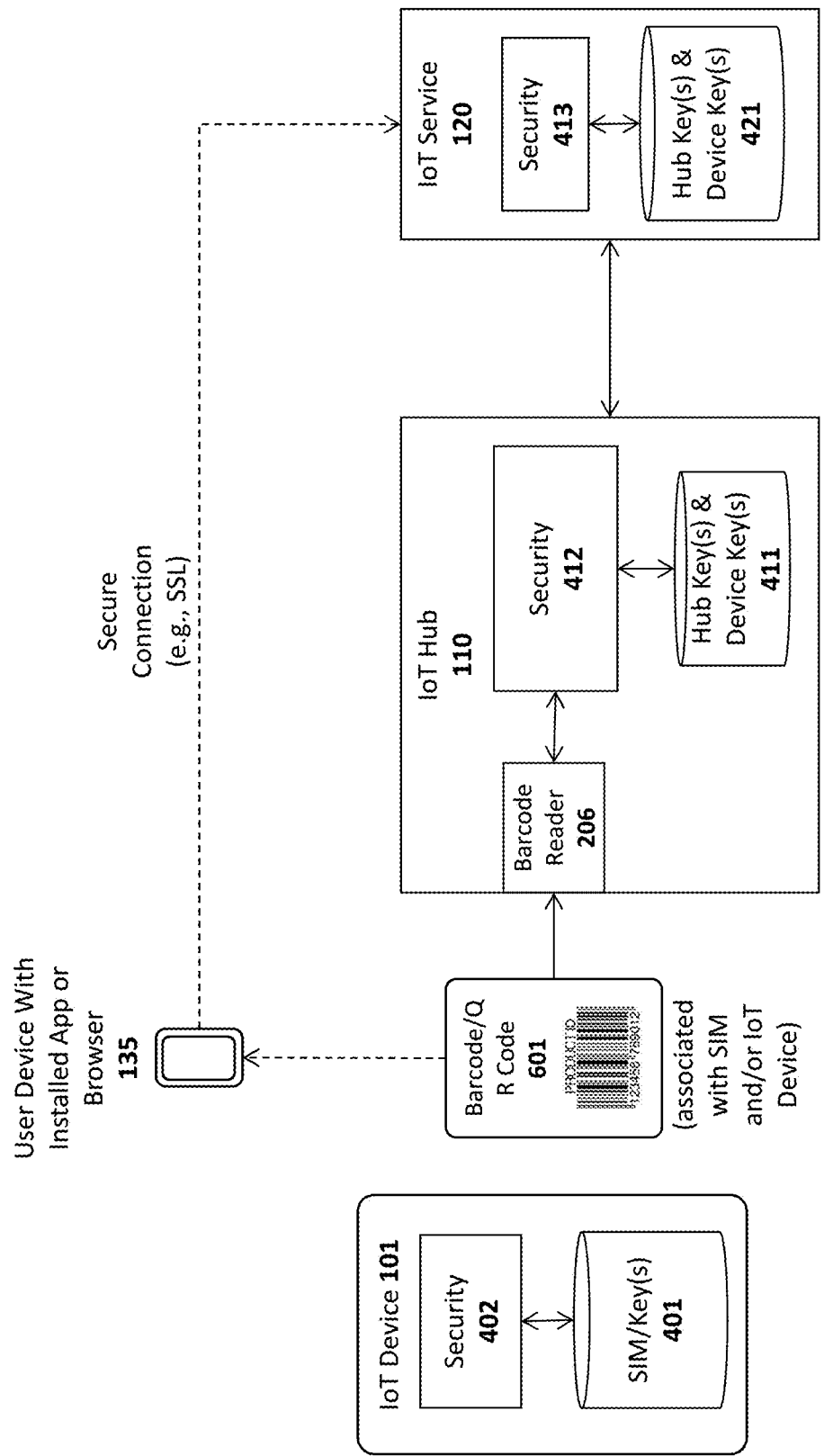
FIG. 6A illustrates one embodiment in which IoT devices are registered using barcodes or QR codes.

For example, as illustrated in FIG. 6A each IoT device 101 or SIM 401 may be packaged with a barcode or QR code 601 uniquely identifying the IoT device 101 and/or SIM 401. In one embodiment, the barcode or QR code 601 comprises an encoded representation of the public key for the IoT device 101 or SIM 401. Alternatively, the barcode or QR code 601 may be used by the IoT hub 110 and/or IoT service 120 to identify or generate the public key (e.g., used as a pointer to the public key which is already stored in secure storage). The barcode or QR code 601 may be printed on a separate card (as shown in FIG. 6A) or may be printed directly on the IoT device itself. Regardless of where the barcode is printed, in one embodiment, the IoT hub 110 is equipped with a barcode reader 206 for reading the barcode and providing the resulting data to the security logic 412 on the IoT hub 110 and/or the security logic 413 on the IoT service 120. The security logic 412 on the IoT hub 110 may then store the public key for the IoT device within its secure key storage 411 and the security logic 413 on the IoT service 120 may store the public key within its secure storage 421 (to be used for subsequent encrypted communication).

In one embodiment, the data contained in the barcode or QR code 601 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 402 on the IoT device 101 and the security logic 412 on the IoT hub 110 may be implemented using hardware, software, firmware or any combination thereof. For example, in one embodiment, the security logic 402, 412 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 402, 412, in one embodiment, the security logic 402, 412 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 601 may be used to pair each IoT device 101 with the IoT hub 110. For example, rather than using the standard wireless pairing process currently used to pair Bluetooth LE devices, a pairing code embedded within the barcode or QR code 601 may be provided to the IoT hub 110 to pair the IoT hub with the corresponding IoT device.

Figure 6B:
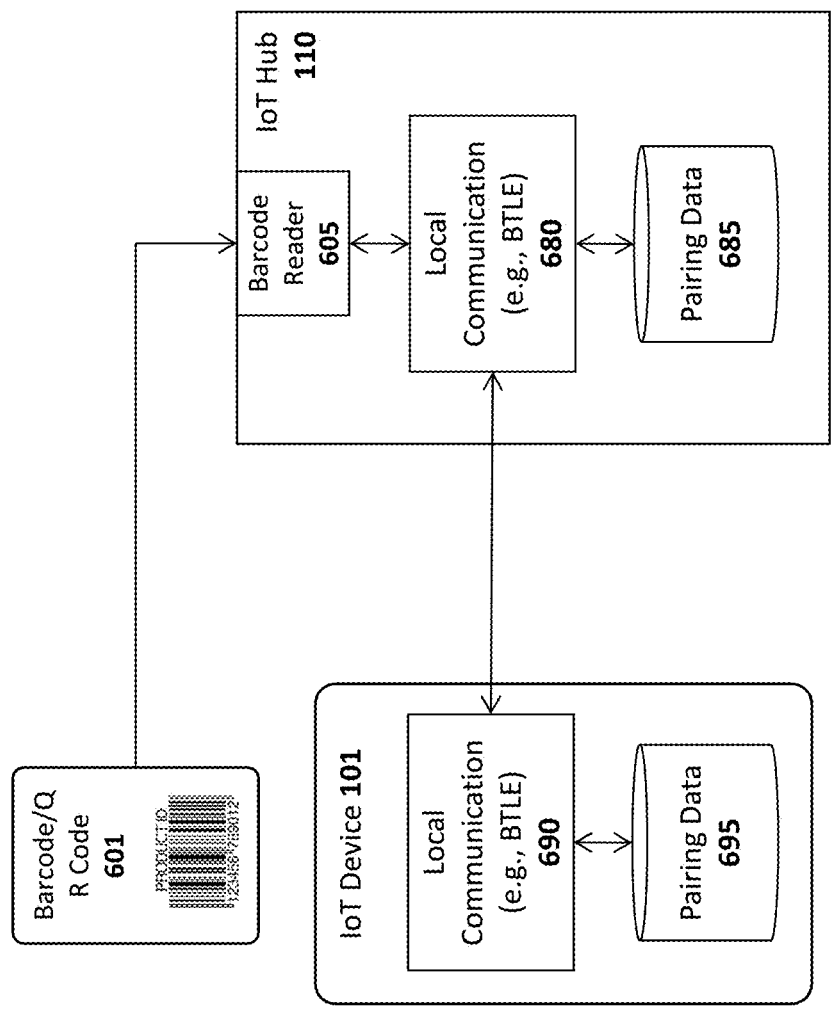
FIG. 6B illustrates one embodiment in which pairing is performed using barcodes or QR codes.

FIG. 6B illustrates one embodiment in which the barcode reader 206 on the IoT hub 110 captures the barcode/QR code 601 associated with the IoT device 101. As mentioned, the barcode/QR code 601 may be printed directly on the IoT device 101 or may be printed on a separate card provided with the IoT device 101. In either case, the barcode reader 206 reads the pairing code from the barcode/QR code 601 and provides the pairing code to the local communication module 680. In one embodiment, the local communication module 680 is a Bluetooth LE chip and associated software, although the underlying principles of the invention are not limited to any particular protocol standard. Once the pairing code is received, it is stored in a secure storage containing pairing data 685 and the IoT device 101 and IoT hub 110 are automatically paired. Each time the IoT hub is paired with a new IoT device in this manner, the pairing data for that pairing is stored within the secure storage 685. In one embodiment, once the local communication module 680 of the IoT hub 110 receives the pairing code, it may use the code as a key to encrypt communications over the local wireless channel with the IoT device 101.

Similarly, on the IoT device 101 side, the local communication module 690 stores pairing data within a local secure storage device 695 indicating the pairing with the IoT hub. The pairing data 695 may include the pre-programmed pairing code identified in the barcode/QR code 601. The pairing data 695 may also include pairing data received from the local communication module 680 on the IoT hub 110 required for establishing a secure local communication channel (e.g., an additional key to encrypt communication with the IoT hub 110).

Thus, the barcode/QR code 601 may be used to perform local pairing in a far more secure manner than current wireless pairing protocols because the pairing code is not transmitted over the air. In addition, in one embodiment, the same barcode/QR code 601 used for pairing may be used to identify encryption keys to build a secure connection from the IoT device 101 to the IoT hub 110 and from the IoT hub 110 to the IoT service 120.

Figure 7:
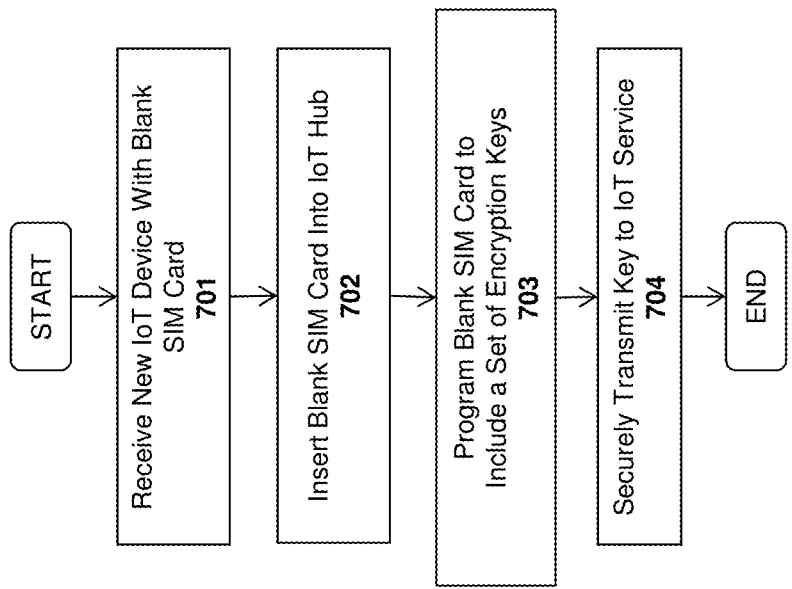
FIG. 7 illustrates one embodiment of a method for programming a SIM using an IoT hub.

A method for programming a SIM card in accordance with one embodiment of the invention is illustrated in FIG. 7. The method may be implemented within the system architecture described above, but is not limited to any particular system architecture.

At 701, a user receives a new IoT device with a blank SIM card and, at 702, the user inserts the blank SIM card into an IoT hub. At 703, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 704, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 7.

Figure 8:
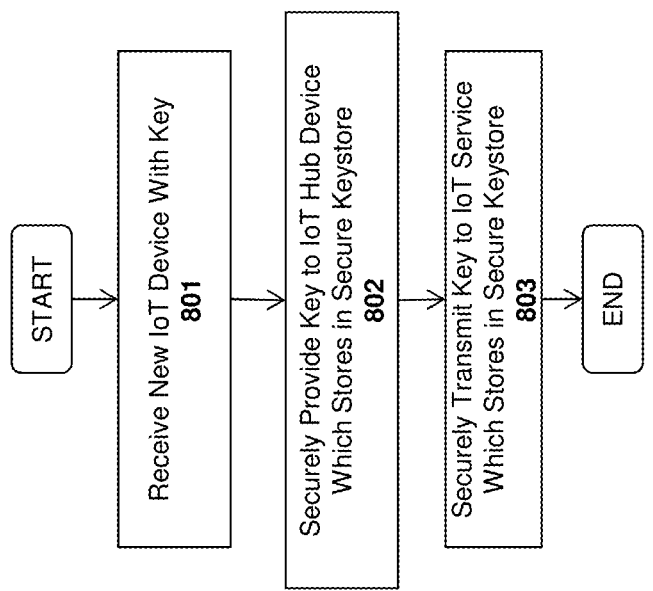
FIG. 8 illustrates one embodiment of a method for registering an IoT device with an IoT hub and IoT service.

A method for integrating a new IoT device into a network is illustrated in FIG. 8. The method may be implemented within the system architecture described above, but is not limited to any particular system architecture.

At 801, a user receives a new IoT device to which an encryption key has been pre-assigned. At 802, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or bowser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 803, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 9:
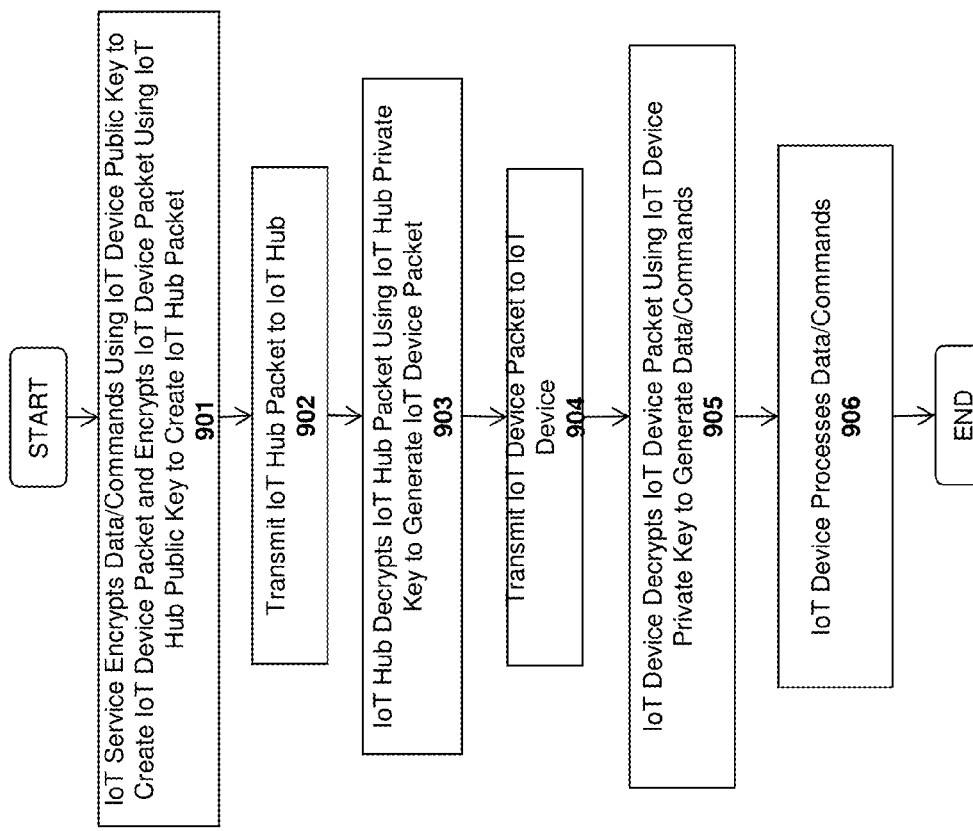
FIG. 9 illustrates one embodiment of a method for encrypting data to be transmitted to an IoT device.

A method for securely communicating commands/data to an IoT device using public/private keys is illustrated in FIG. 9. The method may be implemented within the system architecture described above, but is not limited to any particular system architecture.

At 901, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 902, the IoT service transmits the IoT hub packet to the IoT hub. At 903, the IoT hub decrypts the IoT hub packet using the IoT hub's private key to generate the IoT device packet. At 904 it then transmits the IoT device packet to the IoT device which, at 905, decrypts the IoT device packet using the IoT device private key to generate the data/commands. At 906, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system for establishing a secure communication channel between an Internet of Things (IoT) device and an IoT cloud service comprising:
    an Internet of Things (IoT) device having a machine-readable optical label associated therewith and including a first wireless communication interface;
    an IoT cloud service to manage user accounts, each user account having one or more IoT devices associated therewith, the IoT cloud service to transmit commands to control the IoT devices and to receive data from the IoT devices related to functions performed by the IoT devices, the IoT cloud service to provide access to the data by a plurality of users, each user associated with at least one of the user accounts; and
    an IoT service app to be installed on a mobile user device to cause the mobile user device to establish a secure communication channel with the IoT cloud service and to capture identification data from the optical label associated with the IoT device, the IoT service app to cause the mobile user device to transmit the identification data to the IoT cloud service over the secure communication channel,
    the IoT cloud service to use the identification data to determine an encryption key associated with the IoT device or to use the identification data as an encryption key,
    the IoT cloud service to then use the encryption key to encrypt commands and data to be sent to the IoT device and/or to decrypt data received from the IoT device.

2. The system as in claim 1 wherein the encryption key comprises a public key of the IoT device, the IoT cloud service to use the public key to encrypt commands and data transmitted to the IoT device,
    the IoT device having a private key to decrypt the commands and data received from the IoT cloud service.

3. The system as in claim 1 further comprising:
    an IoT hub having a first wireless communication interface to establish a local wireless communication connection with a second wireless communication interface of the IoT device, the IoT hub to connect the IoT device to the IoT cloud service, wherein the encrypted commands and data are to be transmitted through the IoT hub.

4. The system as in claim 3 wherein the IoT hub further comprises a third wireless communication interface to connect with the IoT cloud service over the Internet.

5. The system as in claim 1 wherein the secure communication channel comprises a secure sockets layer (SSL) communication channel.

6. The system as in claim 1 wherein the IoT service or the mobile user device is to share the encryption key with the IoT hub.

7. The system as in claim 4 wherein the first and second wireless communication interfaces comprise Bluetooth Low Energy (BTLE) interfaces and wherein the third wireless communication interface comprises a WiFi interface.

8. A method comprising:
    associating a machine-readable optical label with an Internet of Things (IoT);
    managing user accounts on an IoT cloud service, each user account having one or more IoT devices associated therewith, the IoT cloud service to transmit commands to control the IoT devices and to receive data from the IoT devices related to functions performed by the IoT devices, the IoT cloud service to provide access to the data by a plurality of users, each user associated with at least one of the user accounts; and
    reading identification data from the machine-readable optical label with an IoT service app installed on a mobile user device, the IoT service app to cause the mobile user device to establish a secure communication channel with the IoT cloud service and to transmit the identification data to the IoT cloud service over the secure communication channel;

using the identification data on the IoT cloud service to determine an encryption key associated with the IoT device or to use the identification data as an encryption key; and using the encryption key on the IoT cloud service to encrypt commands and data to be sent to the IoT device and/or to decrypt data received from the IoT device.

9. The method as in claim 8 wherein the encryption key comprises a public key of the IoT device, the IoT cloud service to use the public key to encrypt commands and data transmitted to the IoT device, the IoT device having a private key to decrypt the commands and data received from the IoT cloud service.

10. The method as in claim 8 further comprising:
establishing communication between the IoT device and IoT cloud service through an IoT hub, the IoT hub having a first wireless communication interface to establish a local wireless communication connection with a second wireless communication interface of the IoT device.

11. The method as in claim 10 wherein the IoT hub further comprises a third wireless communication interface to connect with the IoT cloud service over the Internet.

12. The method as in claim 8 wherein the secure communication channel comprises a secure sockets layer (SSL) communication channel.

13. The method as in claim 8 wherein the IoT service or the mobile user device is to share the encryption key with the IoT hub.

14. The method as in claim 11 wherein the first and second wireless communication interfaces comprise Bluetooth Low Energy (BTLE) interfaces and wherein the third wireless communication interface comprises a WiFi interface.

15. A non-transitory machine-readable medium having program code stored thereon which, when executed by one or more machines causes the one or more machines to perform the operations of:
associating a machine-readable optical label with an Internet of Things (IoT) device;
managing user accounts on an IoT cloud service, each user account having one or more IoT devices associated therewith, the IoT cloud service to transmit commands to control the IoT devices and to receive data from the IoT devices related to functions performed by the IoT devices, the IoT cloud service to provide access to the data by a plurality of users, each user associated with at least one of the user accounts; and reading identification data from the machine-readable optical label with an IoT service app installed on a mobile user device, the IoT service app to cause the mobile user device to establish a secure communication channel with the IoT cloud service and to transmit the identification data to the IoT cloud service over the secure communication channel;

using the identification data on the IoT cloud service to determine an encryption key associated with the IoT device or to use the identification data as an encryption key; and using the encryption key on the IoT cloud service to encrypt commands and data to be sent to the IoT device and/or to decrypt data received from the IoT device.

16. The machine-readable medium as in claim 15 wherein the encryption key comprises a public key of the IoT device, the IoT cloud service to use the public key to encrypt commands and data transmitted to the IoT device, the IoT device having a private key to decrypt the commands and data received from the IoT cloud service.

17. The machine-readable medium as in 8 further comprising program code to cause the machines to perform the operations of:
establishing communication between the IoT device and IoT cloud service through an IoT hub, the IoT hub having a first wireless communication interface to establish a local wireless communication connection with a second wireless communication interface of the IoT device.

18. The machine-readable medium as in claim 17 wherein the IoT hub further comprises a third wireless communication interface to connect with the IoT cloud service over the Internet.

19. The machine-readable medium as in claim 15 wherein the secure communication channel comprises a secure sockets layer (SSL) communication channel.

20. The machine-readable medium as in claim 15 wherein the IoT service or the mobile user device is to share the encryption key with the IoT hub.

21. The machine-readable medium as in claim 20 wherein 18 wherein the first and second wireless communication interfaces comprise Bluetooth Low Energy (BTLE) interfaces and wherein the third wireless communication interface comprises a WiFi interface.

* * * * *